Nov. 7, 1967  J. L. MARTIN  3,351,361
INSULATED PIPING SYSTEM
Filed Feb. 27, 1964

INVENTOR.
JOSEPH L. MARTIN
BY *Watts & Fisher*
ATTORNEYS

United States Patent Office 3,351,361
Patented Nov. 7, 1967

3,351,361
INSULATED PIPING SYSTEM
Joseph L. Martin, Wadsworth, Ohio, assignor to New England Realty Co., a corporation of Ohio
Filed Feb. 27, 1964, Ser. No. 347,824
14 Claims. (Cl. 285—47)

This invention relates generally to conduit systems, and more specifically to improvements in insulated piping systems of the type disclosed in U.S. Patent No. 2,903,017, issued Sept. 8, 1959, to Val Cotman, Jr.

The insulated piping system disclosed in the above-identified patent is formed of a plurality of sections which may be prefabricated at the factory and then assembled at the site of installation, such as in central underground heating systems where fluids subject to temperature variations are to be transported. Each section of the piping system includes an outer conduit, an inner pipe, and a plurality of pipe supports which carry the weight of the pipe and maintain it in spaced relation within the conduit. Suitable thermal insulation material is provided around the pipe to insulate it from the conduit.

In use, the pipes of several sections are connected end-to-end to provide a continuous flow passage, and the surrounding conduits also are connected. Since the pipes are subject to temperature variations when the system is used to transport fluids, such as steam, at temperatures differing from atmospheric or ground temperatures, suitable expansion joints are provided at spaced locations throughout the system. The connected pipes are firmly anchored against axial movement intermediate the expansion joints. In a subterranean installation, for example, the piping system is anchored in an embedding matrix. Thus installed, axial movement of the connected pipes due to expansion and contraction takes place between the anchor locations and is properly distributed between the various expansion joints.

The runs of connected conduit sections in a piping system may terminate at the expansion joints, at expansion legs or risers in manholes or buildings, and adjacent the inner wall surfaces of manholes or buildings. It is the practice to seal the ends of runs so that moisture and the like is prevented from entering and corroding the system. Suitable entry structure is also provided for preventing leakage around the conduit where it enters the wall of a building or manhole.

The conventional conduits of piping systems such as described above have been made of metal, and the anchoring and sealing structures were devised for use in connection with such conduits. More recently, it has been proposed to utilize conduits formed of a non-metallic, cementitious material. The present invention is particularly concerned with the provision of anchoring, entry, and sealing structure for piping systems utilizing the new cementitious conduit.

Accordingly, an object of the invention is to provide improved means for holding and sealing a piping system utilizing cementitious conduits.

Another object of the invention is to provide an anchor construction for piping systems utilizing non-metallic conduits.

A further object of the invention is to provide entry structure for piping systems utilizing non-metallic conduits.

Still another object of this invention is to provide structure for sealing the ends of runs of non-metallic conduits in a piping system.

Another object of the invention is to provide structure as described above which can be easily and effectively applied to the conduits during fabrication and/or installation of the system.

Other objects and a full understanding of the invention will be had by reference to the following detailed description and the accompanying drawing.

Figure 1:
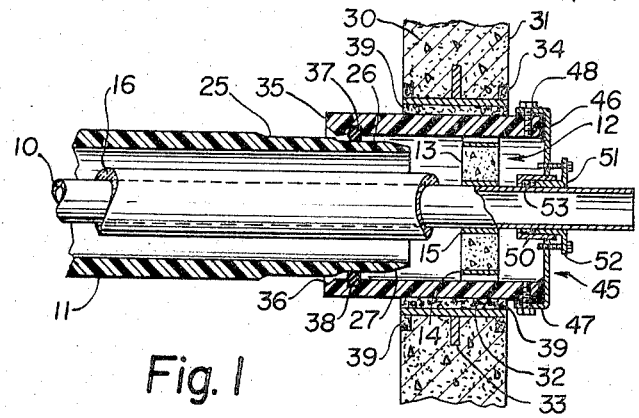
FIGURE 1 is a fragmentary cross-sectional view of a piping system embodying entry and sealing structure provided by the invention.
Figure 2:
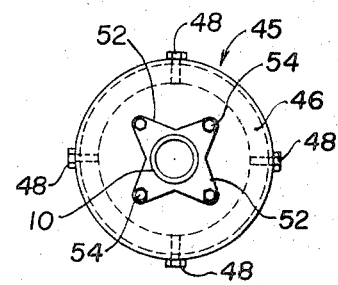
FIGURE 2 is an end elevational view of the arrangement shown in FIG. 1.

Referring now to the drawings, and to FIGS. 1 and 2 in particular, the illustrated section of piping system includes a fluid conducting pipe 10 which is disposed within a surrounding conduit 11. As more particularly described in U.S. Patent 2,903,017, the pipe 10 is supported in spaced relationship in the conduit 11 by pipe supports (not shown). The construction of the pipe supports may be similar to that shown at 12 which includes an annular body 13 of filling and insulating material, such as concrete, bounded by an outer corrugated band 14 and an inner pipe-engaging band 15. A plurality of the supports are positioned around the pipe 10 in axially spaced locations and in peripheral engagement with the inner wall surface of the conduit 11 so as to carry the weight of the pipe while permitting it to expand and contract in length. The portions of the pipe 10 between adjacent supports are preferably covered by jackets or sleeves 16 of suitable insulating material, such as fiberglass or the like.

The conduit 11 is non-metallic and is preferably made of a cementitious material. A suitable material is an asbestos cement sold under the trademark or tradename "Transite" by the Johns-Manville Corporation. The ends of the conduit 11 (only one of which is shown) are machined to provide a reduced outer diameter portion, such as stepped surfaces 25, 26, and beveled outer end surfaces 27.

It will be understood that a complete piping system will include as many of the described sections as are required. During installation the several sections are aligned end-to-end and the adjacent ends of the pipes connected to provide a continuous flow passage. Adjacent conduits may be connected around the pipes by suitable sleeve couplings (not shown).

As shown in FIGS. 1 and 2, the piping system is mounted through a building or manhole wall 30 and the conduit 11 terminates adjacent the inner wall surface 31.

In accordance with this invention, the entry structure for mounting the system through the wall 30 comprises a steel wall sleeve 32 which defines a through opening. A metal leak plate 33 is preferably provided. The leak plate 33 extends radially outwardly between the ends of the sleeve and is embedded in the wall. Suitable sealing material, such as a calking compound or the like, is shown at 34 around the sleeve at both ends.

A long tubular coupling 35 formed of asbestos cement or the like extends through the sleeve 32 and projects beyond the outer surface of the wall 30. The projecting end of the coupling 35 is shown as being machined to provide a beveled inner end surface 36 and a circumferential groove 37 in the inner wall surface of the coupling. The adjacent end of the conduit 11 extends within the coupling 35 and is spaced from its inner wall surface. A fluid tight seal is maintained around the inner disposed end of the conduit 11 by a resilient ring 38 of rubber or the like which is compressed in the groove 37 against the stepped conduit surface 26. The beveled outer end surface 27 of the conduit 11 facilitates its insertion into the coupling 35 and causes the ring 38 to be compressed during installation. A fluid seal is formed around the coupling 35 by calking compound 39 which is placed in the ends of the wall sleeve 32.

As shown in FIG. 1, the pipe 10 extends from the end of the conduit 11 through the tubular coupling 35. The pipe 10 is supported within the coupling by a pipe support 12. The end of the coupling 35 which terminates adjacent the inner wall surface 31 is closed by sealing structure 45.

In the embodiment of FIGS. 1 and 2, the sealing structure 45 is a gland seal which comprises an annular metal end plate 46. According to the preferred construction, the end plate 46 has an outer flange 47 which surrounds the end of the coupling 35. The end plate 46 is secured to the coupling by cap screws 48 which are mounted through the flange 47 and by epoxy cement 49 which is provided between the plate and the end of the coupling.

The illustrated gland seal 45 also includes a tubular bushing 50 which is carried within the annular end plate 46. A gland 51 having bolting flanges 52 is mounted in the bushing 50 around the pipe 10 and suitable packing material 53 is provided between the inner end of the gland and the end of the bushing. The flanges 52 carry bolts 54 which are threaded through the plate 46.

Figure 3:
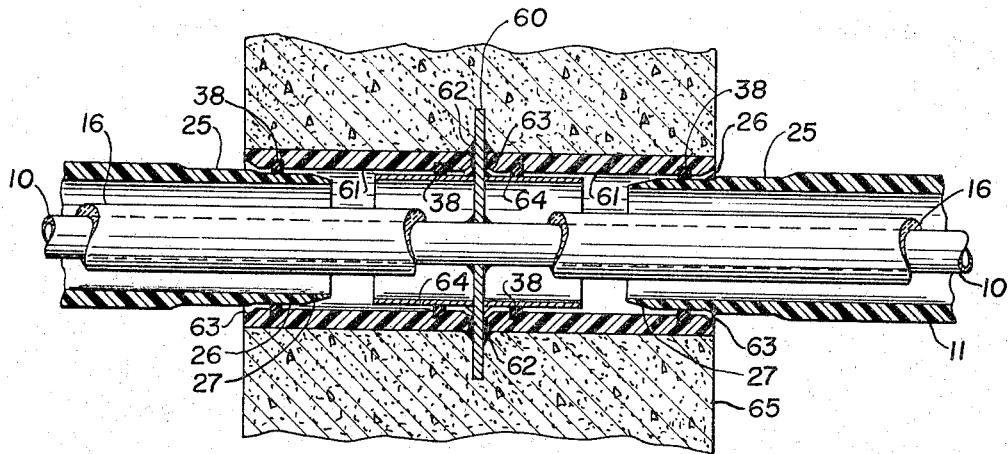
FIGURE 3 is a fragmentary cross-sectional view of a piping system embodying an anchor construction as provided by this invention; and, FIGURE 4 is a foreshortened, fragmentary cross-sectional view showing another anchor construction and entry arrangement for a piping system.

Reference is now made to FIG. 3 which shows a preferred anchor construction for a piping system as described above. At each location where it is desired to anchor the system, a rectangular metal anchor plate 60 having a center opening is provided. The pipe 10 is mounted through the center opening of the anchor plate 60 which is then permanently secured to the pipe, as by welding.

The ends of a pair of tubular couplings 61 which are formed of asbestos cement or the like are secured in axial alignment to opposite faces of the anchor plate 60. Preferably, the couplings 61 are secured to the anchor plate by epoxy cement 62 which is provided around the couplings and between their ends and the plate. Each of the couplings 61 includes beveled inner end surfaces 63 and inner circumferential grooves which carry rubber sealing rings 38.

An absolute seal against the entrance of moisture at the juncture of the anchor plate 60 and the couplings 61 is assured by a pair of steel sleeves 64. The steel sleeves 64 are disposed in axial alignment on opposite sides of the anchor plate 60 and are secured thereto by peripheral welds. The rings 38 adjacent the anchor plate are compressed between the couplings 61 and the inner disposed sleeves 64 to form fluid tight seals. With this construction any moisture which may enter between the ends of the couplings 61 and the anchor plate 60 will be trapped by the adjacent sealing rings 38.

During installation the adjacent ends of a pair of conduits 11 are telescoped into opposite ends of the couplings 61. The sealing rings 38 at the opposite ends of the couplings are compressed against the conduit surfaces 26 to form fluid tight peripheral seals. A block 65 of concrete or similar material is cast around the coupling 61 so as to embed completely the radially projecting portions of the anchor plate 60. Thus installed, the embedded anchor plate prevents axial movement of the pipe 10 due to contraction and expansion.

Figure 4:
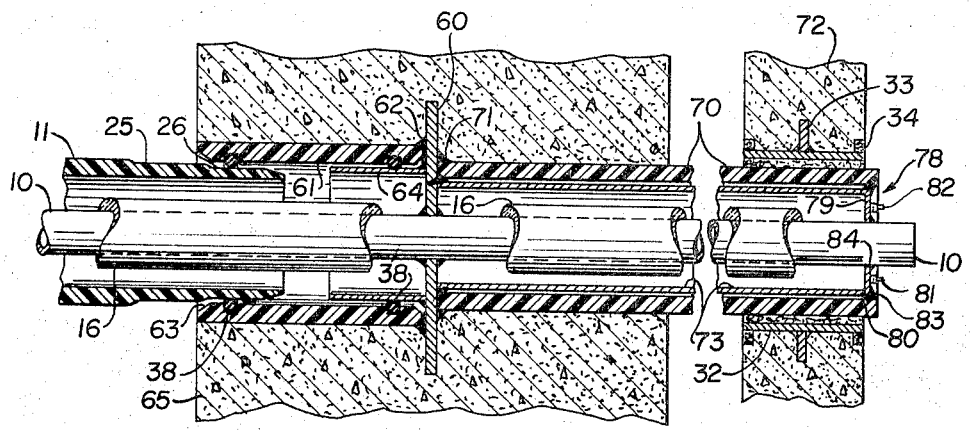

The gland seal 45 which was described in conjunction with FIGS. 1 and 2 is particularly suitable for use at the ends of conduit runs terminating at expansion joints and expansion legs or risers in manholes or buildings. FIGURE 4 illustrates a suitable end seal for installation in which the conduit terminates close, for example, five feet or less, to an anchor in buildings or manholes.

Referring to FIG. 4, the anchor for the system is shown as comprising an anchor plate 60 which is embedded in concrete 65 or the like and welded to the pipe 10. The end of the conduit 11 terminates in a tubular coupling 61 which is bonded to on face of the anchor plate 60 by epoxy cement 62. A steel sleeve 64 also is fixed to the anchor plate and extends within the coupling 61. Sealing rings 38 are carried within the coupling 61 and form fluid tight seals around the conduit 11 and the sleeve 64.

In the embodiment of FIG. 4, a conduit section 70 is bonded by epoxy cement 71 to the side of the anchor plate 60 opposite the coupling 61 and extends from the concrete 65 through the adjacent building or manhole wall 72. A steel sleeve 73 is mounted within the conduit section 70 and has one end welded to the anchor plate 60. The end portion of the conduit section 70 which projects through the wall 72 is surrouned by a wall sleeve 32. As in the embodiment of FIGS. 1 and 2, the wall sleeve 32 preferably is provided with a leak plate 33. Sealing material 34 is provided around the wall sleeve at its ends and at 39 between the sleeve and the conduit section 70.

The end seal shown in FIG. 4 is generally designated by reference numeral 78. The end seal 78 comprises a metal end plate 79 which is fixed to the end of the steel sleeve 73, as by a peripheral weld 80. The outer edge portion of the plate 79 is bonded at 83 by epoxy cement to the inner surface of the conduit portion 70 and the inner edge portion is welded at 84 to the pipe. In this manner, a fluid tight seal is provided between the end of the conduit section 70 and the pipe. Any moisture which may enter between the end plate 79 and the conduit section 70 will be trapped by the sleeve 73 and thus prevented from damaging the pipe insulation 16. If desired, the plate 79 may be provided with conventional vent and drain plugs 81, 82, respectively.

It will be apparent from the foregoing that the invention provides structure for effectively anchoring and holding piping systems utilizing conduits of asbestos cement. The invention also provides entry structure for mounting the conduits through walls and for sealing the ends of conduit runs. One important feature characterizing the invention is the moisture barrier which is provided at all junctures of the conduits with the anchor plates 60 and the seal plates 79. This moisture barrier or seal is formed by a sleeve in the conduit which traps any moisture which may enter at the bonded junctures of the conduit.

Many modifications and variations of the invention will be apparent to those skilled in the art in view of the foregoing detailed description. Therefore, it is to be understood that, within the scope of the appended claims, the invention can be practiced otherwise than as specifically shown and described.

What is claimed is:

1. In a piping system of the type including conduit means and fluid conducting pipe means supported in spaced relation within said conduit means, said conduit means and said pipe means being formed by connected sections, the improvement comprising an anchor plate fixed to said pipe means transversely of its axis, a pair of tubular couplings disposed on and adjoining opposite sides of said plate, said plate extending outwardly of said couplings so that axial movement of said pipe means can be prevented by fixedly securing the extending portions of said plate, said conduit means having the ends of adjacent sections projecting into a different one of said couplings, fluid seal means between said couplings and the inner disposed ends of said adjacent conduit sections, and means in said couplings for trapping moisture entering at the junctures between said couplings and said anchor plate.

2. The improvement as claimed in claim 1 wherein said means for preventing the entry of moisture comprises a sleeve within each coupling, said sleeves being fixed to opposite faces of said anchor plate, and means forming a fluid seal between said couplings and said sleeves.

3. In a piping system of the type described, a fluid conducting pipe, an anchor plate fixed to said pipe and extending outwardly thereof, a pair of conduit sections spacedly surrounding said pipe, coupling means connecting said conduit sections, said coupling means being secured to opposite faces of said plate, said plate extending outwardly of said coupling means so that axial movement of said pipe can be prevented by fixedly securing the extending portion of said plate, means forming a fluid seal between said coupling means and said conduit sections, sleeve means secured to opposite faces of said plate within said coupling means, and means forming a fluid seal between said coupling means and said sleeve means.

4. In a piping system of the type described, the improvement comprising a pipe, an anchor plate fixed to said pipe transversely of its axis, a conduit section spacedly surrounding said pipe on each side of said plate, means connecting each of said conduit sections to said plate, including a seal formed between the connecting means and associated conduit section, said connecting means for at least one section including a tubular coupling member having one end fixed to said plate, said one section having an end disposed within the end of said coupling member opposite said one end, sleeve sealing means sealingly engaging said plate and extending from said plate around said pipe, and a seal formed between the sleeve sealing means and said connecting means.

5. The system as claimed in claim 4 including an end seal in the other of said conduit sections, said end seal forming a seal between the end of said other conduit section and said pipe.

6. A piping system comprising a pipe, a radially extending anchor plate fixed to said pipe, a tubular member spacedly surrounding said pipe on each side of said plate, each of said members having an end bonded to a face of said plate, a sleeve disposed within each tubular member, each of said sleeves having an end welded to a face of said plate, and means forming circumferential fluid seals between said members and said sleeves, said seals being spaced from said plate.

7. The system as claimed in claim 6 including a conduit section spacedly surrounding said pipe on each side of said plate, each of said sections having an end telescoped into a different one of said tubular members, and means forming a fluid seal between each conduit section and adjacent tubular member.

8. A piping section system comprising a pipe, a radially extending metal anchor plate fixed to said pipe, a tubular coupling of cementitious material on each side of said plate, each of said couplings having an end epoxy cemented to a face of said plate, a metal sleeve in each coupling, each of said sleeves having an end welded to a face of said plate, a seal ring carried within each coupling, said seal rings being disposed in peripheral sealing engagement with said sleeves and said tubular coupling, a conduit section of cementitious material spacedly surrounding said pipe on each side of said plate, each of said conduit sections having an end telescoped into a different one of said couplings, and another seal ring carried within each of said couplings, said another seal ring being disposed in peripheral sealing engagement with said conduit sections and said tubular couplings.

9. The system as claimed in claim 8 wherein said couplings and conduit sections are formed of asbestos cement.

10. In a piping system of the type including a conduit and a pipe supported in spaced relation within said conduit, said pipe having one end extending from said conduit through a wall opening defined by a wall sleeve, the improvement comprising a tubular member of cementitious material extending through said sleeve, said member being spaced inwardly of said sleeve, means sealing the ends of said sleeve around said member, and an end seal between said pipe and one end of said member, said end seal including an annular plate peripherally bonded to said one end of said member.

11. The improvement as claimed in claim 10 wherein said end seal includes a gland seal about the pipe, and wherein said conduit has an end telescoped into the end of said tubular member opposite said one end.

12. The improvement as claimed in claim 10 wherein said annular plate is welded to said pipe, and wherein said system further includes a metal sleeve within said tubular member, said metal sleeve having one end welded to said annular plate.

13. In a piping system including a conduit of cementitious material, and a pipe supported in spaced relation within said conduit, said pipe extending from one end of said conduit through a wall sleeve, the improvement comprising a tubular member of cementitious material extending through said sleeve, sealing material between said member and said sleeve, said conduit having said one end telescoped into one end of said member, a sealing ring carried in said member and forming a fluid-tight peripheral seal between said conduit and said member, a pipe support supporting said pipe within said member, and means forming a bolted gland seal around said pipe at the end of said member opposite said one end, said gland seal forming means including a plate epoxy cemented to said member.

14. In a piping system including a conduit of cementitious material and a pipe supported in spaced relation within said conduit, said pipe projecting from one end of said conduit through a wall opening defined by a wall sleeve, the improvement comprising a radially extending anchor plate fixed to said pipe, means forming a fluid tight seal between said conduit and one face of said anchor plate, a conduit section spacedly surrounding said pipe on the side of said anchor plate opposite said conduit, said conduit section having one end bonded to said anchor plate and an opposite end extending through said wall sleeve, sealing material between said wall sleeve and said conduit section, an annular end plate bonded to said end of said conduit section and welded to said pipe, and a metal sealing sleeve extending within said conduit section, said metal sealing sleeve having one end welded to said anchor plate and an opposite end welded to said annular end plate.

References Cited
UNITED STATES PATENTS

| | | | |
|---|---|---|---|
| Re. 22,988 | 3/1948 | McLeish | 285—47 |
| 534,629 | 2/1895 | Burlingame | 285—133 |
| 1,391,396 | 9/1920 | McMurtric | 285—158 |
| 2,438,412 | 3/1948 | Morris | 285—158 X |
| 2,519,203 | 8/1950 | Stoecklin | 285—61 |
| 2,546,533 | 3/1951 | Williamson | 248—49 |
| 2,958,546 | 11/1960 | Lee | 285—21 |
| 3,068,026 | 12/1962 | McKamery | 285—47 |
| 3,184,958 | 5/1965 | Eaton | 285—47 X |

FOREIGN PATENTS 1,280,003  11/1961  France.

EDWARD C. ALLEN, *Primary Examiner.*

CARL W. TOMLIN, *Examiner.*

D. W. AROLA, *Assistant Examiner.*